US012621388B2

(12) United States Patent    (10) Patent No.:   US 12,621,388 B2

Braganza et al.     (45) Date of Patent:    May 5, 2026

---

(54) DEVICE, SYSTEM AND METHOD FOR PROVIDING MACHINE LEARNING PROMPTS ON A CALL AT A CONTACT CENTER SERVER

(71) Applicant: MITEL NETWORKS CORPORATION, Kanata (CA)

(72) Inventors: Jonathan Braganza, Ottawa (CA); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 287 days.

(21) Appl. No.: 18/367,637

(22) Filed: Sep. 13, 2023

(65)      Prior Publication Data

US 2025/0088591 A1     Mar. 13, 2025

(51) Int. Cl.
*H04M 3/00*      (2024.01)
*H04M 3/51*      (2006.01)
*H04M 3/523*     (2006.01)

(52) U.S. Cl.
CPC ....... *H04M 3/5191* (2013.01); *H04M 3/5232* (2013.01)

(58) Field of Classification Search
CPC ........................... H04M 3/5191; H04M 3/5232
USPC ....... 379/265.01–265.14, 266.01–266.1, 309
See application file for complete search history.

(56)      References Cited

U.S. PATENT DOCUMENTS 10,498,897 B1 * 12/2019 Chadha ............... H04M 3/5237
12,073,340 B1 * 8/2024 Li .................... G06Q 10/06311

| | | | | |
|---|---|---|---|---|
| 12,093,658 | B1 * | 9/2024 | Silver ..................... | G06F 40/40 |
| 2016/0275582 | A1 * | 9/2016 | Zuverink ............ | G06F 3/04842 |
| 2017/0242886 | A1 * | 8/2017 | Jolley ................... | G06F 40/211 |
| 2019/0132451 | A1 * | 5/2019 | Kannan ............... | H04M 3/5235 |
| 2020/0007474 | A1 * | 1/2020 | Zhang ..................... | G09B 7/02 |
| 2023/0059979 | A1 * | 2/2023 | Sharma ............... | H04M 3/5166 |
| 2023/0153356 | A1 * | 5/2023 | Buckley ................. | H04L 51/02 704/275 |
| 2025/0039303 | A1 * | 1/2025 | Bhattacharjee ..... | H04M 3/5175 |

OTHER PUBLICATIONS

Stats that prove the efficacy of Music on Hold—Audio Productions (002)—https://www.audpro-onhold.com/stats-that-prove-the-efficacy-of-music-on-hold/—downloaded Sep. 12, 2023.
Music on Hold Messaging Research—On H (002)—https://www.telephoneonhold.com/research.html—downloaded Sep. 12, 2023.
ECommerce Security: Protecting Your Store from Cyberattacks—https://www.hostinger.com/tutorials/ecommerce-security—downloaded Sep. 12, 2023.

* cited by examiner

*Primary Examiner* — William J Deane, Jr.

(57)        ABSTRACT

A device, system and method for providing machine learning prompts on a call at a contact center server are provided. A contact center (CC) server receives a call. The CC server receives, on the call, an indication of a queue, of a plurality of queues maintained by the CC server, into which to place the call. The CC server places the call into the queue indicated by the indication, the call placed into the queue in a hold state. A machine learning engine generates, based on historical data associated with the queue, one or more prompts for the call. The CC server provides the one or more prompts on the call during the hold state.

18 Claims, 8 Drawing Sheets

200

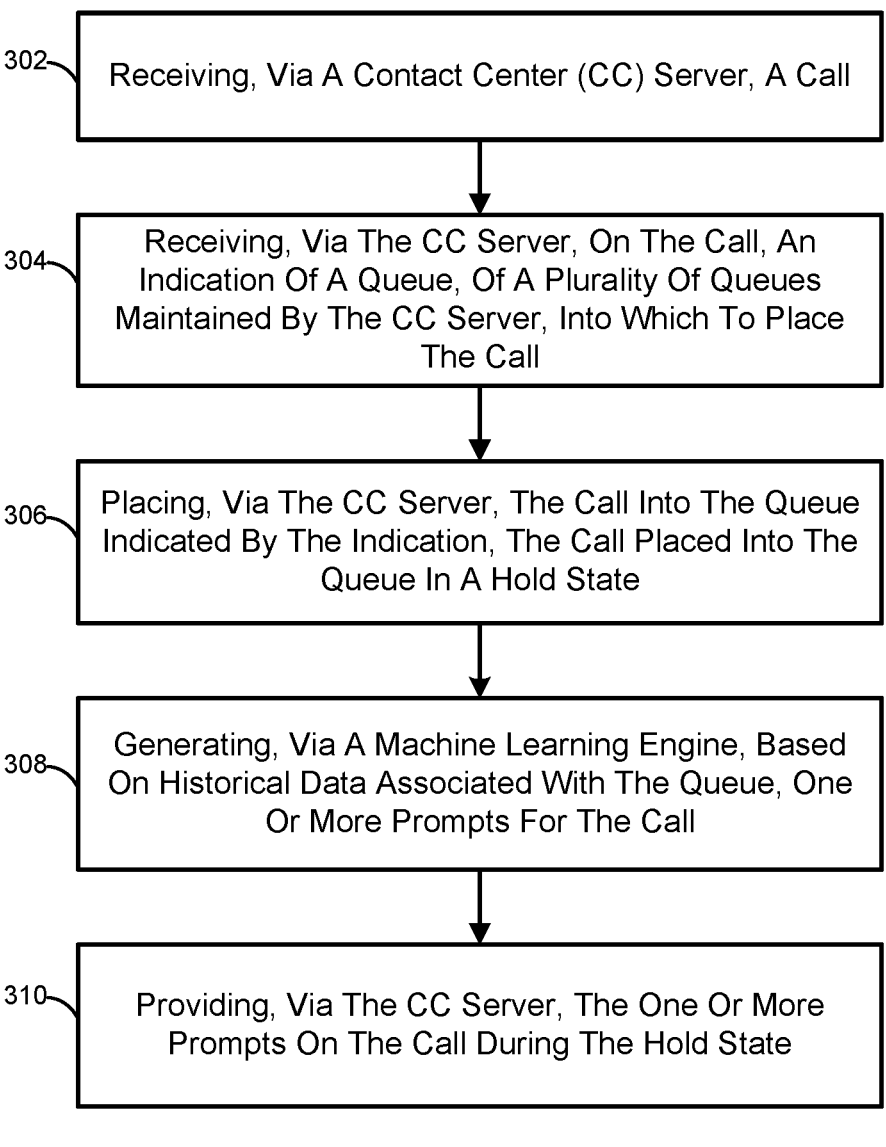

302 — Receiving, Via A Contact Center (CC) Server, A Call

304 — Receiving, Via The CC Server, On The Call, An Indication Of A Queue, Of A Plurality Of Queues Maintained By The CC Server, Into Which To Place The Call 306 — Placing, Via The CC Server, The Call Into The Queue Indicated By The Indication, The Call Placed Into The Queue In A Hold State 308 — Generating, Via A Machine Learning Engine, Based On Historical Data Associated With The Queue, One Or More Prompts For The Call 310 — Providing, Via The CC Server, The One Or More Prompts On The Call During The Hold State

DEVICE, SYSTEM AND METHOD FOR PROVIDING MACHINE LEARNING PROMPTS ON A CALL AT A CONTACT CENTER SERVER

FIELD

The present specification generally relates to server devices, and machine learning-based methods therefor. More particularly, exemplary embodiments of the specification relate to a device, system and method for providing machine learning prompts on a call at a contact center server.

BACKGROUND

At contact center (CC) servers, for example at customer service centers, calls are placed into a hold state and into a queue and eventually answered by an agent using a terminal. While in the queue, hold music, and the like, may be played on the call. In some examples, callers may be informed of the position of the call in the queue and/or estimated wait times may be repeatedly provided on the call. However, queues use processing and bandwidth resources, as does music, call position processing and estimated wait time processing.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

Subject matter of the present specification is particularly pointed out and distinctly claimed in the concluding portion of the specification. A more complete understanding of the present specification, however, may best be obtained by referring to the detailed description and claims when considered in connection with the drawing figures.

FIG. 3 illustrates a method for providing machine learning prompts on a call at a contact center server, in accordance with exemplary embodiments of the specification.

Figure 1:
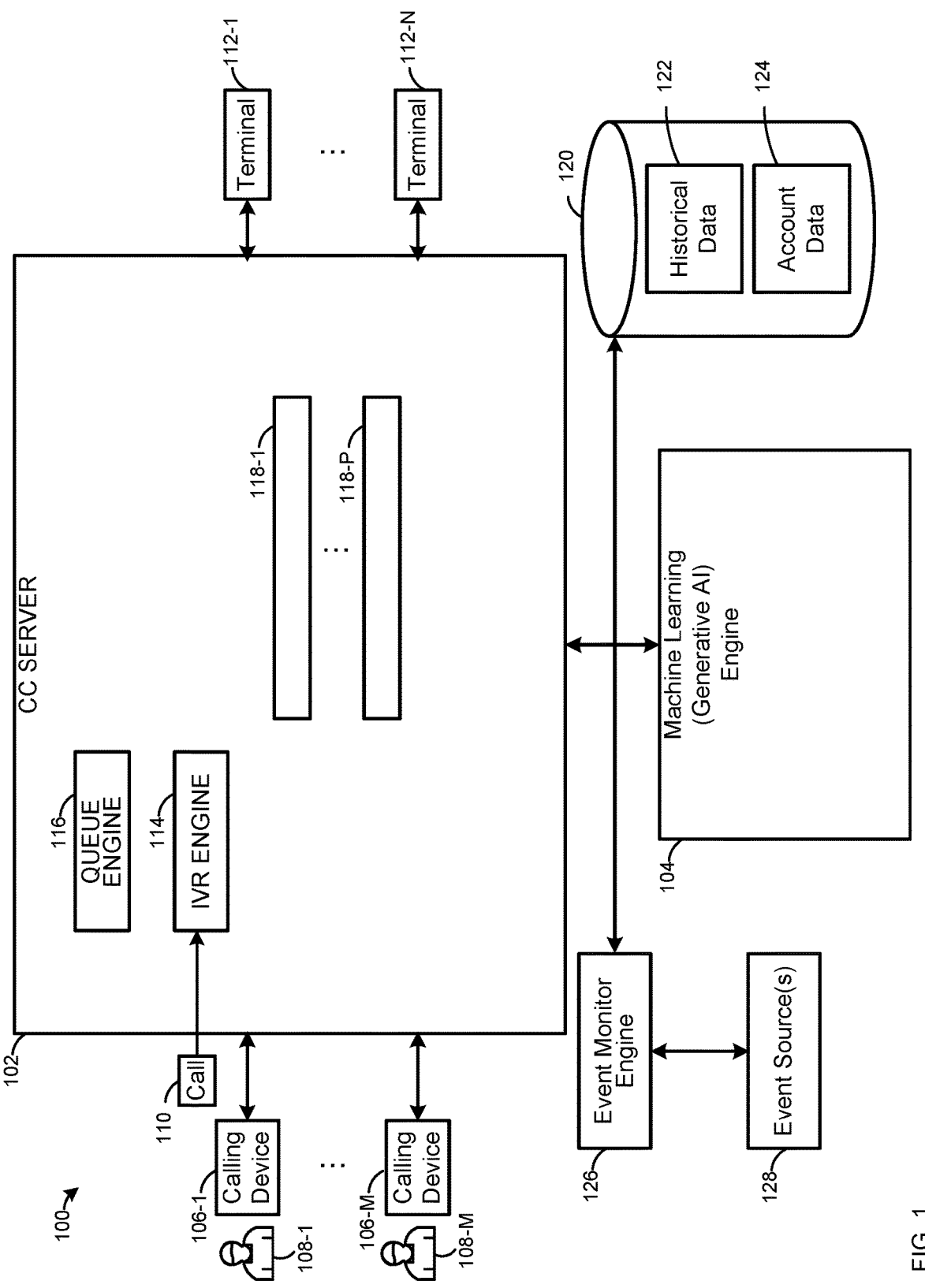
FIG. 1 illustrates a system in accordance with exemplary embodiments of the specification.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present specification.

DETAILED DESCRIPTION OF EXEMPLARY EMBODIMENTS

The description of various embodiments of the present specification provided below is merely exemplary and is intended for purposes of illustration only; the following description is not intended to limit the scope of the specification disclosed herein. Moreover, recitation of multiple embodiments having stated features is not intended to exclude other embodiments having additional features or other embodiments incorporating different combinations of the stated features.

The specification describes exemplary devices, systems, and methods. As set forth in more detail below, exemplary devices, systems, and methods described herein may be conveniently used in customer service centers. However, the specification is not limited to such applications.

As used herein, the term "engine" refers to hardware (e.g., a processor, such as a central processing unit (CPU), graphics processing unit (GPU), an integrated circuit or other circuitry) or a combination of hardware and software (e.g., programming such as machine-or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

Furthermore, communication links between components of examples described herein are depicted throughout the present specification, as double-ended arrows between respective components; the communication links may include any suitable combination of wireless and/or wired links and/or wireless and/or wired communication networks.

An aspect of the present specification provides a method comprising: receiving, via a contact center (CC) server, a call; receiving, via the CC server, on the call, an indication of a queue, of a plurality of queues maintained by the CC server, into which to place the call; placing, via the CC server, the call into the queue indicated by the indication, the call placed into the queue in a hold state; generating, via a machine learning engine, based on historical data associated with the queue, one or more prompts for the call; and providing, via the CC server, the one or more prompts on the call during the hold state.

Another aspect of the present specification provides a computing device comprising: a controller; and a computer-readable storage medium having stored thereon program instructions that, when executed by the controller, causes the controller to perform a set of operations comprising: receiving, via a contact center (CC) server, a call; receiving, via the CC server, on the call, an indication of a queue, of a plurality of queues maintained by the CC server, into which to place the call; placing, via the CC server, the call into the queue indicated by the indication, the call placed into the queue in a hold state; generating, via a machine learning engine, based on historical data associated with the queue, one or more prompts for the call; and providing, via the CC server, the one or more prompts on the call during the hold state.

A further aspect of the present specification provides a non-transitory computer-readable storage medium having stored thereon program instructions that, when executed by a computing device, causes the computing device to perform a method comprising: receiving, via a contact center (CC) server, a call; receiving, via the CC server, on the call, an indication of a queue, of a plurality of queues maintained by the CC server, into which to place the call; placing, via the CC server, the call into the queue indicated by the indication, the call placed into the queue in a hold state; generating, via a machine learning engine, based on historical data associated with the queue, one or more prompts for the call; and providing, via the CC server, the one or more prompts on the call during the hold state.

FIG. 1 illustrates a system 100 in accordance with exemplary embodiments of the specification. System 100 includes a contact center (CC) server 102, interchangeably referred to hereafter as the server 102, in communication with a machine learning (ML) engine 104 (e.g., which may, as depicted, include, but is not limited to, a generative artificial intelligence (AI) engine, and the like).

In some examples, the server 102 and the ML engine 104 may be at least partially combined into a single computing device and/or server and/or engine. When combined, the server 102 and the ML engine 104 may share processing resources and the like.

As depicted, the server 102 may communicate with a plurality of calling devices 106-1, . . . 106-M, operated by respective callers 108-1, . . . 108-M. The calling devices 106-1, . . . 106-M are interchangeably referred to hereafter, collectively, as the calling devices 106 and, generically, as a calling device 106. This convention will be used elsewhere in the present specification. For examples, callers 108-1, . . . 108-M are interchangeably referred to hereafter, collectively, as the callers 108 and, generically, as a caller 108. Furthermore, the number "M" of calling devices 106 and respective callers 108 may be as few as one calling device 106 and respective caller 108, or tens to hundreds to thousands of calling devices 106 and respective callers 108, and/or any suitable number.

Furthermore, a calling device 106 may comprise any suitable calling device, such as a cell phone, a landline phone, a laptop computer and/or tablet equipped with calling hardware, and the like. A calling device 106 is understood to include a controller (e.g., such as a processor) and a memory. Furthermore, it is understood that the calling device 106 may make calls to the server 102, which may be a component of a call center, and the like, handling calls (e.g., including, but not limited to, "1-800" calls) on behalf of an entity, such as a business. For example, a calling device 106 may be operated by a caller 108 to make a 1-800 call to the server 102 to resolve a technical issue, and the like, with goods and/or services provided by the entity. In a specific example the entity may provide customer premises equipment (CPE), such as modems, routers, and the like, and/or internet services, and the like. Alternatively, and/or in addition, a calling device 106 may be operated by a caller 108 to make a call to the server 102 to register (e.g., as a new client) with the entity, purchase CPE, and/or other goods, from the entity, purchase a service (e.g., such as internet access in present examples), and the like, amongst other possibilities.

As depicted, the server 102 is receiving a call 110 from the calling device 106-1. For example, the caller 108-1 may have operated the calling device 106-1 to place the call 110 to resolve an issue.

The server 102 is in further communication with terminals 112-1 . . . 112-N (e.g., terminals 112 and/or a terminal 112), which may be operated by call center representatives (not depicted), such as agents, and the like. The number "N" of the terminals 112 may be as few as one terminal 112, as many as tens to hundreds of terminals 112, and/or any suitable number.

A terminal 112 may comprise a combination of hardware and software such that calls may be answered by a respective agent and the agent may interact with the terminal 112 to manage and/or resolve any issues raised on a call by a caller 108. A terminal 112 is understood to include a controller (e.g., such as a processor) and a memory. Furthermore, as the terminals 112 are operated by human agents, the terminals 112 may be interchangeably referred to as human-operated terminals 112.

Ideally, the call 110 may be answered by a terminal 112, such that the caller 108-1 may speak with an agent operating a terminal 112.

However, as often occurs at a call center, all the terminals 112 may be busy answering other calls and hence, as described herein, the call 110 may be answered by an IVR (interactive voice response) engine 114 implemented by the server 102.

The IVR engine 114 may comprise any suitable combination of speech-to-text and text-to-speech functionality to communicate with the caller 108-1 via the calling device 106-1, for example by providing one or more prompts to the calling device 106-1 on the call 110, as well as receive responses from the calling device 106-1 on the call 110. Hereafter, for simplicity, reference to providing prompts and/or receiving responses, and the like, to or from the caller 108-1 (or any caller 108), is understood to occur via the calling device 106-1 (or a respective calling device 106).

The one or more prompts provided by IVR engine 114 may be in a form of voice and/or audio prompts, and the like, however, in other examples, such one or more prompts may be in a form of text prompts, and the like. Similarly, responses from the calling device 106-1 may be in the form of voice and/or audio responses, and the like and/or in a form of text responses, and the like. Hence, while hereafter voice and/or audio prompts and responses are described, text prompts and responses are understood to be within the scope of the present specification.

It is furthermore understood that responses from the calling device 106-1 may be in a form of voice and/or audio and/or text responses, and the IVR engine 114 may convert such responses to text, such that the one or more prompts and the responses may be combined into a transcript of the call 110. Indeed, any calls to the server 102 may be converted into a respective transcript.

When the call 110 is answered, the IVR engine 114 may initially implement a call answer script, and the like, to ask and/or prompt the caller 108-1 to indicate what the call 110 is about. For example, such a call answer script may comprise text (e.g., converted to speech on the call 110-1), with one or more prompts, such that the IVR engine 114 may provide prompts such as "Hello! Your call is important to us, but all our lines are busy. What are you calling about?" In some examples, the prompts provided by the IVR engine 114 may cause the caller 108-1 to verbally indicate why they made the call 110; for example, the caller 108-1 may say, on the call 110, "I am calling about a technical problem with my router".

Alternatively, and/or in addition, the prompts may include requesting that the caller 108-1 press a button on the calling device 106-1 to indicate why they made the call 110. For example, the prompts provided by the IVR engine 114 on the call may comprise various categories from which the caller 108-1 may select, such as: "Hello! Your call is important to us, but all our lines are busy. Press 1 for technical problems with your router, press 2 for router sales, press 3 for a new account, press 4 for anything else", and the like. However, any suitable number of categories are within the scope of the present specification.

In some examples, the prompts may include asking the caller 108-1 to enter and/or recite an account number of an account the caller 108-1 may have with the entity associated with the server 102.

Regardless, it is understood that, on the call 110, the server 102 may receive an indication of why the call 110 was received, which may be processed by a queue engine 116 implemented by the server 102 to place the call 110 into a respective queue, as is next described.

For example, the server 102 may be implementing a plurality of queues 118-1 . . . 118-P (e.g., queues 118 and/or a queue 118), with "P" being any suitable number of queues 118. Indeed, a number "P" of the queues 118 may be at least the number of categories provided in the prompts, however, the number "P" of queues 118 may be any suitable number.

Furthermore, a queue 118 may be associated with a respective category/In general, a call may be placed into a queue 118 of a given category, depending on a response received on the call, as described herein, and in particular at the end of a queue 118, and calls are answered in the queue 118 by terminals 112 dedicated to the given category (e.g., agents operating such terminals 112 may be specifically dedicated to resolving issues associated with the category). As calls at the front of a queue 118 are answered by terminals, a call initially at the end of the queue 118 is moved up in queue 118. Hence, calls in a queue 118 are generally in a hold state, which requires processing and bandwidth resources at the server 102.

In a particular example of categories of the queues 118, the queue 118-1 may be dedicated to calls associated with technical problems with routers, another queue 118 may be dedicated to calls associated with sales of CPE and/or services, yet another queue 118 may be dedicated to calls associated with new accounts, while yet another queue 118 may be dedicated to calls associated with other issues (e.g., anything else) and/or calls for which an indication is not received and/or calls for which an indication may not be determined.

In a particular example, and returning to the indication of the call 110 received at the server 102 from the calling device 106-1, when the indication of why the call 110 was received indicates that the call 110 is associated with technical problems with routers, the queue engine 116 may place the call 110 into the queue 118-1 associated with technical problems with routers.

Hence, put another way, the indication of why the call 110 was received may be interchangeably referred to as an indication of a queue 118 into which to place the call 110.

Furthermore, the call 110 may be placed into the queue 118-1 in a hold state.

However, rather than play music on the call 110, and the like, while the call 110 is in the queue 118-1, the ML engine 104 may generate one or more prompts for the call 110 based, for example, on historical data associated with the queue 118-1.

For example, as depicted, the server 102 and the ML engine 104 are in communication with a memory 120 which stores historical data 122 associated with the queue 118-1. The memory 120 may be in the form of a database, and the like, and the memory 120 may be a component of one or more of the server 102 and the ML engine 104. Regardless, it is understood that the server 102 and the ML engine 104 have access to the memory 120 and the historical data 122. For example, the server 102 may populate the historical data 122 and the ML engine 104 may use the historical data 122 as input. In some examples, the ML engine 104 may also populate the historical data 122.

While for simplicity, only one set of historical data 122 is depicted, that is understood to be associated with the queue 118-1, the memory 120 may store a plurality of sets of historical data associated with respective queues 118.

The historical data 122 may, for example comprise transcripts of previous calls of the queue 118-1, generated when such calls are answered by a terminal 112 or generated when the ML engine 104 interacts with such calls to provide prompts, and receive responses, as described herein with respect to the call 110.

In some examples, the historical data 122 may comprise respective historical data associated with the caller 108-1 on the call 110, including, but not limited to, transcripts of previous calls the caller 108-1 made to the CC server 102 (e.g., using a calling device 106, which may be the same as, or different from, the calling device 106-1).

As depicted, the memory 120 may further store account data 124 associated with the caller 108-1 which may identify goods previously provided to the caller 108-1 (e.g., such as a router in present examples) and/or services to which the caller 108-1 as subscribed (e.g., such as an internet access plan, and the like). Such account data 124 may include, but is not limited to an account number, which may be provided by the caller 108-1 on the call 110, and which may hence enable the account data 124 to be identified. Furthermore, in some examples, the historical data 122 comprise the account data 124 and/or, when the caller 108-1 has made previously made a call associated with the queue 118-1, an indicator of the account data 124 may be stored at the historical data 122.

Furthermore, while only one set of account data 124 is depicted, it is understood that the memory 120 may store set of similar account data for any of the callers 108 that have an account with the entity associated with the system 100.

The historical data 122 may be populated in other ways. For example, as depicted, the system 100 comprises an event monitor engine 126, which may be a component of the server 102 and/or the ML engine 104, which monitors one or more event sources 128, such as news servers, weather servers, social media servers, and the like, to receive data associated with one or more categories of the queues 118. For example, a news server and/or a weather server and/or a social media server may indicate power outage events and/or internet outage events, which may affect CPE, and the like.

As will be explained herein, the ML engine 104 may be generally trained to generate, based on the historical data 122 associated with a queue 118, one or more prompts for calls in a hold state in a queue 118. For example, the ML engine 104 may generate, based on the historical data 122 associated with the queue 118-1, one or more prompts for the call 110, and the one or more prompts may be provided, on the call 110, during the hold state, via the server 102 and/or the IVR engine 114.

In particular, the ML engine 104 may attempt to resolve the call 110 before the call 110 is transferred to a terminal 112, for example freeing up processing and/or bandwidth resources at the server 102 (e.g., and/or a terminal 112). In a particular example, when the call 110 in the queue 118-1 is about a technical problem with a router, the ML engine 104 may provide one or more prompts to resolve the technical problem with the router to obviate transferring the call 110 to a terminal 112, and/or to resolve the call 110 such that the call 110 ends before transferring the call 110 to a terminal 112, and/or to reduce a length of time the call 110 is in the queue 118-1. Such prompts may be based on the historical data 122.

For example, the historical data 122 may indicates that a last given number of calls to the queue 118-1 (e.g., 5 calls, 10 calls, 15 calls, amongst other possibilities), and/or a portion thereof, included a particular and/or estimated reason for the calls, such as a particular technical problem with routers, as well as a technical solution that resolved the particular technical problem. In these examples, the one or more prompts may include the particular and/or estimated reason for calls; in particular, the caller 108-1 may be asked, via an initial prompt generated by the ML engine 104, if they are calling about the same particular technical problem with their routers as a last given number of callers 108. When the caller 108-1 indicates, in a response, that they are calling about the same particular technical problem, the technical solution that resolved the particular technical problem with the router may be provided on the call 110.

In some examples, the caller 108-1 may be asked if the technical solution resolved the call 110, and the user 108-1 may indicate "YES" or "NO", and the like. (e.g., which may alternatively occur via actuation of a button at the calling device 106-1). Or, more generally, the caller 108-1 may be asked if prompts provided on the call 110 resolved the call 110 and/or if the call 110 was successful. Regardless, when the user 108-1 indicates that the call 110 is resolved and/or successful, a transcript of the call 110 may be stored at the historical data 122 and used as a positive training example to better train the ML engine 104. Alternatively, when the user 108-1 indicates that the call 110 is not resolved and/or unsuccessful, a transcript of the call 110 may be stored at the historical data 122 and used as a negative training example to better train the ML engine 104.

Figure 2:
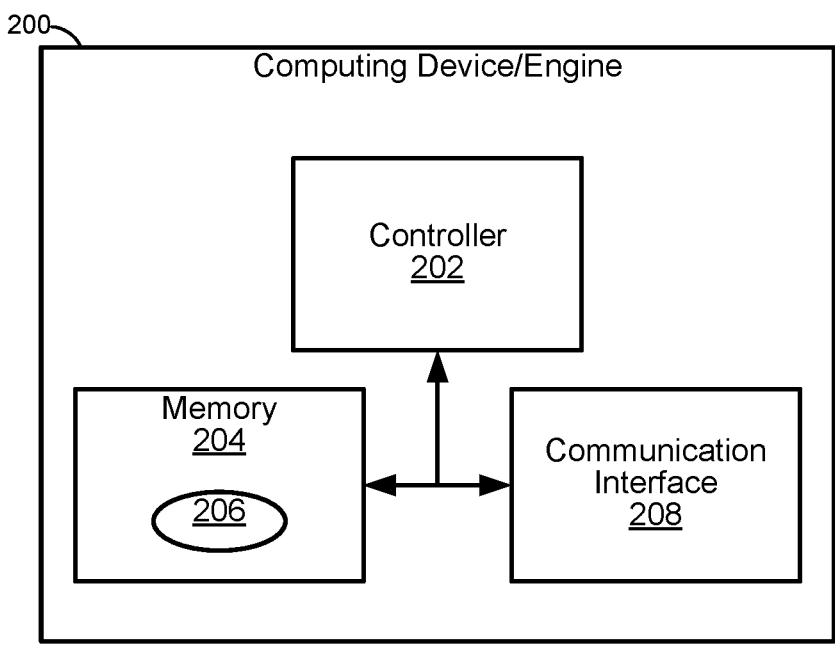
FIG. 2 illustrates an exemplary computing device and/or engine for providing machine learning prompts on a call at a contact center server, in accordance with exemplary embodiments of the specification.

Attention is next directed to FIG. 2 which depicts an example schematic diagram of an example computing device 200 and/or engine (interchangeably referred to hereafter as the computing device 200). The computing device 200 is understood to comprise an example structure of the server 102 and/or the ML engine 104 (e.g., and/or the event monitor engine 126). The computing device 200 may comprise any suitable combination of one or more servers and/or engines, one or more cloud computing devices and/or engines, and the like. While depicted as one device, the computing device 200 may comprise one or more computing devices and/or one or more servers and/or one or more cloud computing devices that may be geographically distributed. In some examples, the computing device 200, and/or a portion thereof, may be combined with one or more of the terminals 112

As shown in FIG. 2, the computing device 200 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the computing device 200 to communicate with other components of the system 100 (e.g., the client devices 106, the terminals 112, the event sources 128 etc.), though it is understood such communication may occur at least partially locally when components of the system 100 are combined (e.g., the computing device 200 may be partially combined with one or more of the terminals 112). The communication interface 208 therefore may include any necessary components (e.g., network interface controllers (NICs), radio units, and the like) to communicate with other components of the system 100. The specific components of the communication interface 208 may be selected based on upon the nature of networks of the system 100 used by components of the system 100 to communicate, and/or local communication between components of the system 100, and the like. The computing device 200 may also include input and output devices connected to the controller 202, such as keyboards, mice, displays, and the like (not shown).

The components of the computing device 200 mentioned above may be deployed in a single enclosure, or in a distributed format. In some examples, therefore, the computing device 200 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the computing device 200; regardless, the controller 202 is understood to have access to the memory 204.

The memory 204 also stores a plurality of computer-readable programming instructions, executable by the controller 202, in the form of various applications, including the application 206.

As will be understood by those skilled in the art, the controller 202 executes the instructions of the application 206 in order to perform a set of operations defined by the instructions contained therein including, but not limited to, the blocks of a method described with respect to FIG. 3. In the description below, the controller 202, and more generally the computing device 200. It will be understood that they are so configured via the execution (by the controller 202) of the instructions of the application 206 stored in the memory 204. Put another way, the computing device 200 may comprise a computer-readable storage medium (e.g., a non-transitory computer-readable storage medium) having stored thereon program instructions that, when executed by the controller 202, causes the controller 202 to perform a set of operations comprising the blocks of the method described with respect to FIG. 3.

Furthermore, when the application 206 is for implementing the ML engine 104, the application 206 may include any suitable combination of one or more machine learning algorithms, which may include machine learning algorithms for implementing a generative artificial intelligence. Such machine learning algorithms may include, but are not limited to: a deep-learning based algorithm; a neural network;

a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network and/or generative artificial intelligence algorithm and/or quantum machine learning algorithm is within the scope of present examples.

While structure of the client devices 106 and the terminals 112 is not described in detail, the client devices 106 and the terminals 112 are understood to have a similar structure as the computing device 200, but adapted for the respective functionality of the client devices 106 and the terminals 112.

Referring to FIG. 3, a flowchart of a method 300 for providing machine learning prompts on a call at a contact center server is depicted. The operations of the method 300 of FIG. 3 correspond to machine readable instructions that are executed by the server 102 and the ML engine 104, for example by the controller 202 and/or respective controllers 202 thereof. In the illustrated example, the instructions represented by the blocks of FIG. 3 may be stored at a memory 204 and/or respective memories 204 of the server 102 and the ML engine 104, for example, as the application 206. The method 300 of FIG. 3 is one way in which the system 100 and/or 102 and/or the ML engine 104 and/or the computing device 200 and/or the controller 202 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1 and FIG. 4, as well.

Beginning at a block 302, the CC server 102 receives a call, such as the call 110.

At a block 304, the CC server 102 receives, on the call, an indication of a queue 118, of a plurality of queues 118 maintained by the CC server 102, into which to place the call.

At a block 306, the CC server 102 places the call into the queue indicated by the indication, and the call is placed into the queue in a hold state.

At a block 308, the machine learning engine 104 generates, based on historical data associated with the queue 118, one or more prompts for the call.

At a block 310, the CC server 102 provides the one or more prompts on the call during the hold state.

The method 300 is next described with respect to FIG. 4, FIG. 5, FIG. 6, FIG. 7 and FIG. 8, which are substantially similar to FIG. 1, with like components having like numbers. It is further understood in these examples that all the terminals 112 are engaged in calls and/or cannot receive a call, such as the call 110; as such any call received at the server 102, such as the call 110, is to be placed into a queue 118.

Furthermore, as has already been described, the ML engine 104 may comprise a generative artificial intelligence engine. However, any suitable machine learning engine is within the scope of the present specification.

Figure 4:
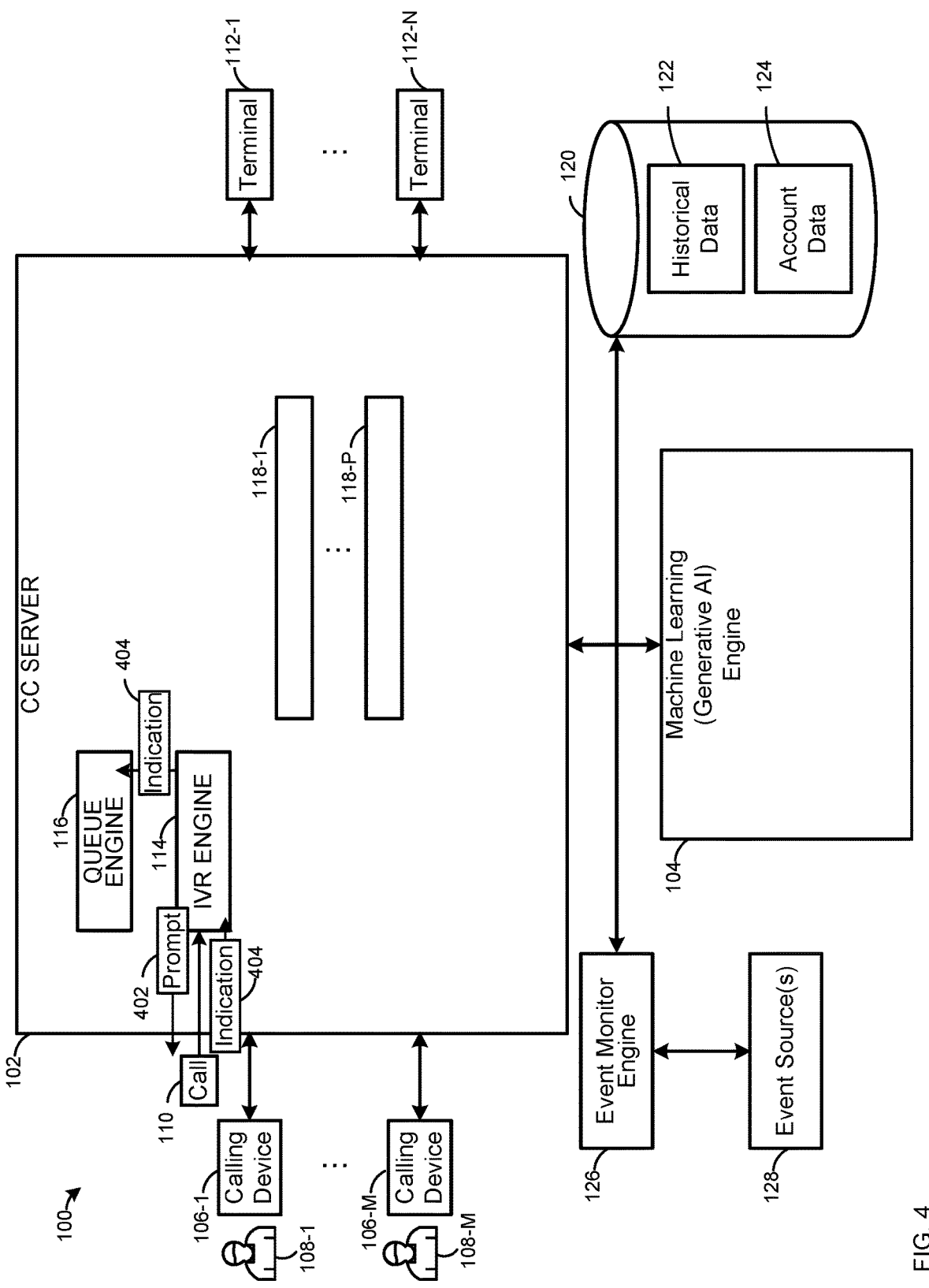
FIG. 4 depicts the system of FIG. 1 implementing aspects of a method for providing machine learning prompts on a call at a contact center server, in accordance with exemplary embodiments of the specification.

Attention is first directed to FIG. 4, which depicts the call 110 being received (e.g., at the block 302 of the method 300) at the server 102, and in particular at the IVR engine 114.

The server 102 and/or the IVR engine 114 is understood to answer the call 110, and the IVR engine 114 may provide one or more answering prompts 402 on the call 110, such as "Hello! Your call is important to us, but all our lines are busy. What are you calling about?". Optionally, the one or more answering prompts 402 may include categories associated with the queues 118, and indications of buttons to actuate at the calling device 106-1 to select a category; in these examples, the one or more answering prompts 402 may include "Press 1 for technical problems with your router, press 2 for router sales, press 3 for a new account, press 4 for anything else". Alternatively, and/or in addition, the one or more answering prompts 402 may be generated from historical data associated with the queues 118, for example to determine and/or estimate reasons a previous given number of callers 108 (e.g., 10 callers, 20 callers, 30 callers, amongst other possibilities) called the IVR engine 114, and such reasons may be incorporated into the one or more answering prompts 402. In general, such reasons may correspond to categories associated with the queues 118.

As depicted, he server 102 and/or the IVR engine 114 receives (e.g., at the block 304 of the method 300) on the call 110, an indication 404 of a queue 118 (e.g., of the plurality of queues 118 maintained by the server 102) into which to place the call 110. For example, the indication 404 may comprise voice data of "I am calling about a technical problem with my router" and/or an indication of button actuated at the calling device 106-1 to select one of the aforementioned categories, such as an indication of a button "1" being actuated. When the indication 404 may comprises voice data, the voice data may be converted to text.

Either way, in the present example, the indication 404 may indicate that the call 110 is to be placed into the queue 118-1.

As depicted, the indication 404 (e.g., voice data converted to text and/or an indication of button actuated at the calling device 106-1 to select one of the aforementioned categories) is provided from the IVR engine 114 to the queue engine 116 which determines with which of the queues 118 the indication 404 is associated. For example, as the queue 118-1 may be associated with technical problems with routers, the queue engine 116 may determine that the indication 404 indicates that the call 110 is to be placed into the queue 118-1.

Figure 5:
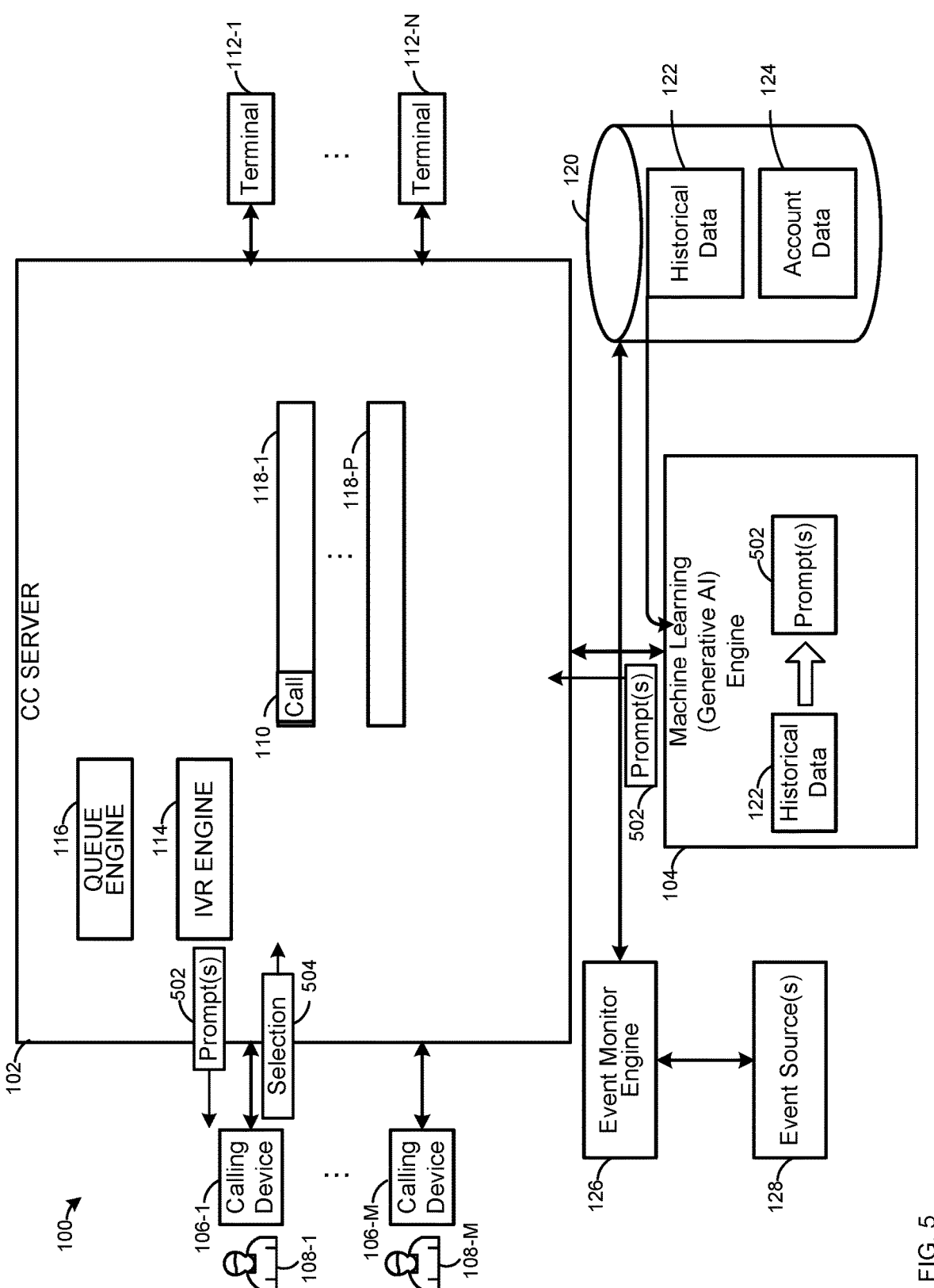
FIG. 5 depicts the system of FIG. 1 implementing further aspects of a method for providing machine learning prompts on a call at a contact center server, in accordance with exemplary embodiments of the specification.

Attention is next directed to FIG. 5, which depicts the call 110 placed (e.g., at the block 306 of the method 300) into the queue 118-1. The call 110 may be placed into the queue 118-1 by the queue engine 116. The call 110 is furthermore understood to be in a hold state (e.g., the call 110 is not transferred to a terminal 112) and placed at an end of the queue 118-1. While other calls in the queue 118-1 (or other queues 118) are not depicted, they are nonetheless understood to be present. Furthermore, the method 300 may be implemented for such calls in the queue 118-1 and/or for such calls in the other queues 118.

While in FIG. 5 the call 110 is not depicted between the calling device 106-1 and the server 102, it is understood that the server 102 maintains the call 110, and continues to communicate with the calling device 106-1 on the call 110, as described herein, while the call 110 is in queue 118-1 and/or in a hold state.

As depicted, for example in response to the call 110 being placed into the queue 118-1, the ML engine 104 receives, as input, the historical data 122 and generates (e.g., at the block 308 of the method 300) one or more prompts for the call 110 including, but not limited to, an initial prompt 502.

The historical data 122 may comprise one or more of:

Historical caller data associated with previous calls associated with a category of the queue 118-1. For example, such historical caller data may include transcripts of previous calls placed into the queue 118-1 (e.g., and with which the ML engine 104 interacted as described herein). Alternatively, or in addition, historical caller data may comprise transcripts of previous calls transferred to a terminal 112 which indicate that such previous calls were associated with a category of the queue 118-1. Alternatively, or in addition, historical caller data may comprise records of previous calls placed into the queue 118-1 and/or transferred to a terminal 112, which indicate that such previous calls were associated with a category of the queue 118-1. Such historical caller data may indicate reasons for the previous calls, such as technical problems of respective routers of respective callers 108. In some examples, such historical caller data may further indicate how previous calls were successfully resolved, such as technical solutions for the respective routers, of respective callers 108.

Respective historical data associated with the caller 108-1 on the call 110. For example, such historical data associated with the caller 108-1 on the call 110 may comprise previous transcripts and/or records which indicate previous reasons the caller 108-1 called the server 102, and may comprise technical problems and technical solutions for a router of the caller 108-1. Such historical data associated with the caller 108-1 on the call 110 may include the account data 124, and/or a link and/or an identifier of the account data 124.

News data associated with a category of the queue 118-1. Such news data may be received from one or more event sources 128 via the event monitor engine 126, and may indicate events (e.g., power outages and/or internet outages, and the like) that may affect a router of the caller 108-1, and the like. Alternatively, and/or in addition, such news data may indicate weather events that may affect a router of the caller 108-1, and the like, such as storms, lightning, and the like. For example, such news data may comprise news server stories indicating such events.

Social media data associated with the category of the queue 118-1. Similar to the news data, such social media data may be received from one or more event sources 128 via the event monitor engine 126, and may indicate events (e.g., power outages and/or internet outages, and the like) that may affect a router of the caller 108-1, and the like. Alternatively, and/or in addition, such social media may indicate weather events that may affect a router of the caller 108-1, and the like, such as storms, lightning, and the like. For example, such social media data may comprise social media posts indicating such events.

However, the historical data 122 may comprise any suitable historical data 122.

The initial prompt 502 may include one or more estimated reasons for the call 110, for example determined from the historical data 122.

For example, the historical data 122 associated with the queue 118-1 may comprises historical caller data of a given number of previous calls (e.g., 5 calls, 10 calls, 15 calls, amongst other possibilities) that preceded the call 110. Such historical data 122 may indicate that the last given number of previous calls, and/or a portion thereof, and/or a majority portion thereof (e.g., more than half of the last given number of previous calls) were about a particular technical problem, such as a router losing a connection to the internet, setting up a secure network with such a router, and the like.

As depicted, the initial prompt 502 is provided from the ML engine 104 to the server 102. The server 102, and more specifically the IVR engine 114, provides (e.g., at the block 310 of the method 300) the initial prompt 502 to the calling device 106-1. For example, the initial prompt 502 may include one or more estimated reasons for the call 110, for example as estimated from the historical data 122.

For example, the initial prompt 502 may include "Of the last ten callers, six called about losing a connection to the internet, while another four called about setting up a secure network with a router. Are calling about losing a connection to the internet or setting up a secure network with a router?". In some examples, the initial prompt 502 provided to the calling device 106-1 may further comprise options such a "Press 1 for losing a connection to the internet; Press 2 for setting up a secure network with a router; Press 3 for other issues", and the like.

In other examples, the initial prompt 502 (and/or other one or more prompts for the call 110) may be further based on respective historical data 122 associated with the caller 108-1 on the call 110. For example, the respective historical data 122 associated with the caller 108-1 may indicate that, in previous calls, the caller 108-1 had called about setting up a secure network with a router. In these examples, the initial prompt 502 may include: "You previously called about setting up a secure network with a router. Press 1 problems with a secure network already set up; Press 2 for setting up a secure network with a router; Press 3 for losing a connection to the internet; Press 4 for other issues", and the like.

As depicted, the server 102 and/or the IVR engine 114 receives, in response to the initial prompt 502, a selection 504 of an estimated reason, of the one or more estimated reasons, which may include selection of one of the options previously described, or a verbal indication of the selection. For example, when a verbal indication, the selection 504 may include: "I'm calling again about setting up a secure network with my router", and the like.

Put another way, the method 300 may further comprise: generating, via the machine learning engine 104, an initial prompt, of the one or more prompts, that includes one or more estimated reasons for the call 110; receiving, on the call 110, a selection of an estimated reason, of the one or more estimated reasons; and generating (e.g., as described hereafter), via the machine learning engine 104, the one or more prompts that follow the initial prompt 502, based on the selection 504 of the estimated reason.

Figure 6:
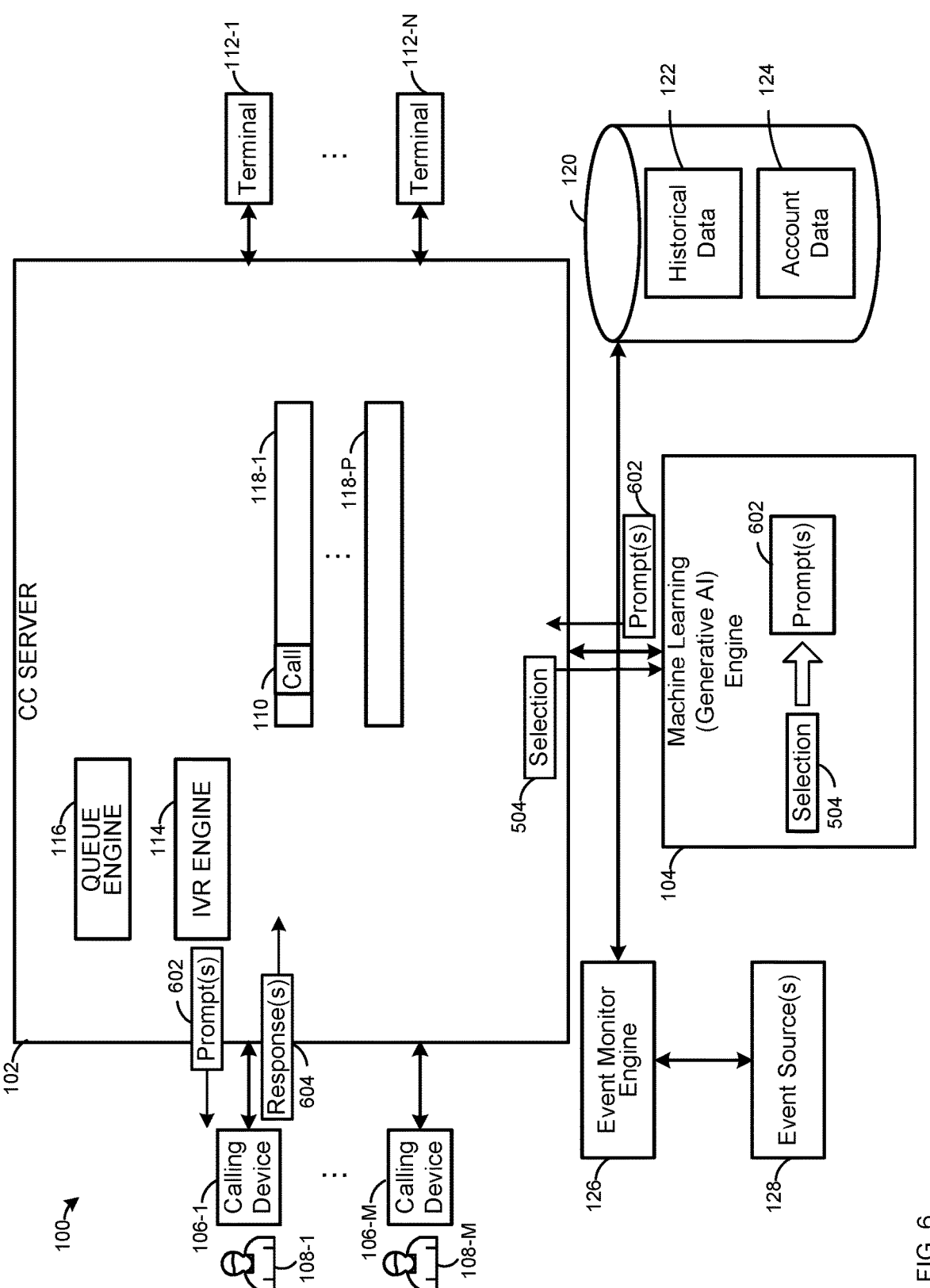
FIG. 6 depicts the system of FIG. 1 implementing further aspects of a method for providing machine learning prompts on a call at a contact center server, in accordance with exemplary embodiments of the specification.

Attention is next directed to FIG. 6, which depicts the selection 504 being provided to the ML engine 104, which generates, from the selection 504, and the historical data 122, one or more prompts 602 to attempt to resolve the selected reason. As also depicted in FIG. 6, the call 110 may have moved up in the queue 118-1.

Alternatively, or in addition, the features depicted in FIG. 5 may be optional and the one or more prompts 602 may be provided (e.g., without the selection 504) to resolve an estimated reason for the call 110 which may be based on the category of the queue 118-1 and associated historical data 122. For example, the historical data 122 may indicate that all (and/or a majority) of a previous given number of callers were calling about a given technical problem, and the one or more prompts 602 may be to resolve the same given technical problem. Alternatively, the historical data 122 may indicate that the caller 108-1 has made previous calls about a given technical problem, and the one or more prompts 602 may be resolve the same given technical problem.

Regardless, as depicted, the one or more prompts 602 are provided to the server 102 and provided (e.g., at the block 310 of the method 300) on the call 110, which may result in one or more responses 604 from the caller 108-1, which may again be provided to the ML engine 104 (not depicted) to generate one or more further prompts 602.

For example, continuing with the secure network example, the selection 504 input to the ML engine 104 may indicate the caller 108-1 is trying to set up a secure network with a router, and the one or more prompts 602 may comprise instructions for setting up a secure network using a router. The one or more responses 604 may be to request further details, and/or to indicate whether the setting up of the secure network using a router was successful or not.

In some examples, the one or more prompts 602 may include a final prompt which may include an indication to stay on the call 110 to be connected to a terminal 112 and, optionally, an indication of an estimated time until the call 110 is connected to a terminal 112. Such a final prompt may comprise: "If you need further assistance or have any other questions, please stay on the line, and an agent will be available to help you in minutes".

In yet further examples such a final prompt may request input from the calling device 106-1 to indicate whether the call 110 was successful or unsuccessful. For example such a final prompt may comprise a request such as: "We'd appreciate if you enter "1" to indicate whether we resolved your issue, or "2" to indicate that your issue was not resolved".

Put another way, the method 300 may further comprise: generating, via the machine learning engine 104, a final prompt, of the one or more prompts 602, that includes one or more of: an indication that the call 110 is to be transferred to a human-operated terminal 112; an estimated time until a transfer to the human-operated terminal 112; and a request for input from the calling device 106-1 that made the call 110 to indicate whether the call 110 was successful or unsuccessful.

The method 300 may include other features. For example, attention is next directed to FIG. 7, which depicts at least one other call 702 in the queue 118-1 that may have been received prior to the call 110, for example from the calling device 106-M. For example, a number of the calls 110, 702 in the queue 118-1 may be the same as, or less than, a number "M" of the calling devices 106 and respective callers 108. For example, the calls 702 may represent calls to the server 102 by a portion of the calling devices 106 that have been answered and placed in the queue 118-1. The various blocks of the method 300 may be applied to the calls 702.

Figure 7:
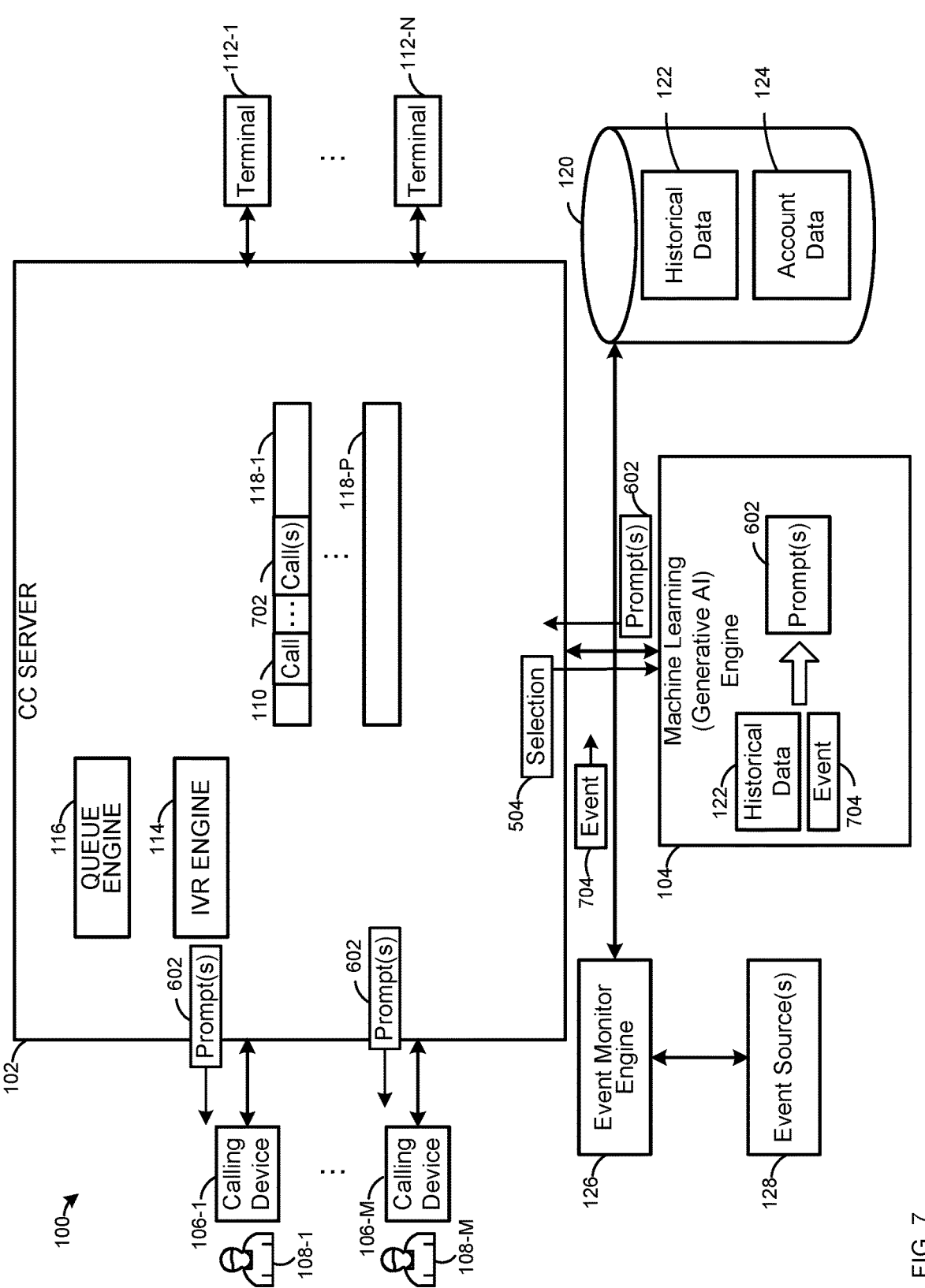
FIG. 7 depicts the system of FIG. 1 implementing further aspects of a method for providing machine learning prompts on a call at a contact center server, in accordance with exemplary embodiments of the specification.

However, as also depicted in FIG. 7, the event monitor engine 126 provides an indication 704 of an event which may have an aggregate effect on the queue 118-1. The indication 704 of the event is understood to have been determined via communications between the event monitor engine 126 and the event sources 128. In a particular example, such an event may comprise an internet outage, and the like which may, for example cause technical problems with routers.

In these examples, the historical data 122 associated with the queue 118-1 may comprise historical caller data of a given number of the previous calls 702 related to the event. For example, the historical data 122 associated with the queue 118-1 may indicate that a given number of callers 108 have called to report that the internet at their routers went out, which may be due to the internet outage indicated by the indication 704. The historical data 122 associated with the queue 118-1 may further indicate that a number of the calls 702 (e.g., call volume) in the queue 118-1 increased after the internet outage, such that the internet outage had an aggregate effect on the queue 118-1. The historical data 122 associated with the queue 118-1 may further indicate that respective reasons for the calls 702 (e.g., caller behavior) in the queue 118-1 were similar after the internet outage (e.g., callers 108 on the calls 702 may indicate that "My router does not have internet access"), such that the internet outage had a further an aggregate effect on the queue 118-1. Put another way, the historical data 122 may indicate patterns or trends influencing call volumes or caller behavior in the queue 118-1 that may have resulted from the event.

As depicted, the indication 704 of the event may indicate a type of the event, a time of the event, and the like, and/or any other information that may enable the ML engine 104 to determine patterns or trends influencing call volumes or caller behavior that may have resulted from the event.

As depicted, the ML engine 104 may receive the indication 704 of the event as input, along with the historical data 122, and generate the one or more prompts 602 that may be provided to the calling device 106-1, as well as one or more of the other calling devices 106 associated with calls 702 in the queue 118-1, to mitigate the impact of the event on the queue 118-1 during the hold state. For example, the ML engine 104 may determine, from the indication 704 and the historical data 122, that call volumes or caller behavior in the queue 118-1 have respectively increased or changed due to the event being an internet outage. To attempt to mitigate the impact of the event on the queue 118-1, the one or more prompts 602 may comprise: "There has been an internet outage which may be affecting your router; please hang up and call back if the problem persists". Such a prompt 602 may be provided even if the caller 108-1 is calling about another technical problem (e.g., such as setting up a secure network), for example when the event may interfere with resolving the other technical problem. As depicted, the one or more prompts 602 are provided to the server 102, which provides the one or more prompts 602 to the calling device 106-1, and other calling devices 106 with associated calls 702 in the queue 118-1, such as the calling device 106-M.

Put another way, the method 300 may further comprise: identifying, via the machine learning engine 104, an event having an aggregate effect on the queue 118-1, wherein the historical data 122 associated with the queue 118-1 comprises historical caller data of a given number of previous calls 702, including other calls 702 related to the event, that preceded the call 110; analyzing, via the machine learning engine 104, the historical caller data related to the event to determine patterns or trends influencing call volumes or caller behavior resulting from the event; generating, via the machine learning engine 104, the one or more prompts 602 specifically tailored to address an impact of the event on the queue 118-1 and provide relevant information or assistance to callers 108 affected by the event; and providing, via the CC server 102, the one or more prompts 602 generated to mitigate the impact of the event on the queue 118-1.

Figure 8:
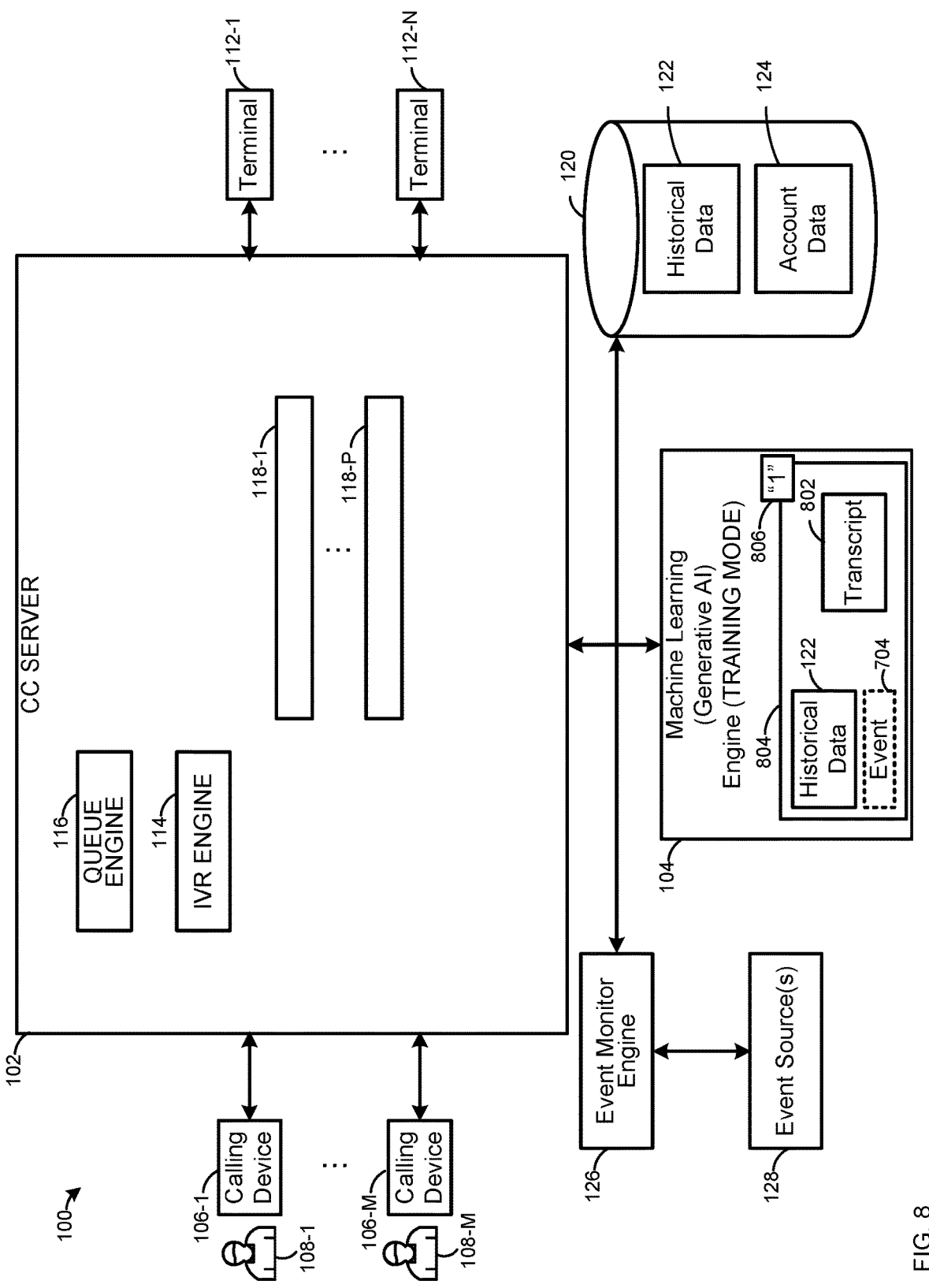
FIG. 8 depicts the system of FIG. 1 implementing a machine learning engine in a training mode, in accordance with exemplary embodiments of the specification.

Attention is next directed to FIG. 8, which depicts the system 100 with the ML engine 104 in a training mode, for example to better train the ML engine 104 to generate prompts. The example of FIG. 8 may follow from FIG. 6 or FIG. 7 and, as such, the call 110 is understood to have ended and hence the call 110 is no longer in the queue 118-1. As such, processing and bandwidth resources have been made available at the server 102.

As depicted, a transcript 802 of the call 110 has been generated, and may be used as training data 804 to better train the ML engine 104 to generate prompts. It is under-stood, for example, that the transcript 802 may include the one or more prompts 502, 602, the selection 504, and the one or more responses 604, and/or any other verbal communi-cations (e.g., converted to text) and/or textual communica-tions on the call 110. Alternatively, or in addition, the transcript 802 may be stored at the historical data 122 for further use in training the ML engine 104 and hence, in some examples, as depicted, the historical data 122 may also be used as training data 804. Optionally, when the indication 704 of the event was used to generate the one or more prompts 602, the indication 704 may also be used as training data 804; the optionality of the indication 704 used as training data 804 is depicted in FIG. 8 by way of the indication 704 being in broken lines.

In particular, the server 102 may be configured to deter-mine whether the call 110 was successful or unsuccessful.

For example, as previously described, a final prompt may request input from the calling device 106-1 as to whether the call 110 was successful or unsuccessful. In some examples, receipt of "1" at the server 102 in response to such a request may indicate that the call 110 was successful, and receipt of "0" at the server 102 in response to such a request may indicate that the call 110 was unsuccessful. Alternatively, or in addition, a verbal response may be received from the caller 108-1 indicating that the call 108-1 was successful or unsuccessful. Put another way, an indication received from the calling device 106-1 may indicate whether the call 110 was successful or unsuccessful.

Alternatively, or in addition, the server 102 may deter-mine whether the call 110 was successful or unsuccessful based on one or more a transcript 802 of the call 110, a length of the call 110, and whether the call is transferred to a human-operated terminal 112. For example, again using the secure network example, the transcript 802 of the call 110 may indicate that the call 110 was successful via text such as "Thank you, my secure network is now set up", and the like; conversely, the transcript 802 of the call 110 may indicate that the call 110 was unsuccessful via text such as "That didn't work, I want to speak to an agent", and the like.

Hence, when the call 110 is not transferred to a terminal 112 (e.g., the caller 108-1 operates the calling device 106-1 to hang up the call 110), the server 102 may determine that the call 110 is successful. However, when the call 110 is transferred to a terminal 112, the server 102 may determine that the call 110 is unsuccessful.

In yet further examples, a length of the call 110 may indicate whether the call 110 was successful or unsuccessful. For example, when the call 110 is less than a threshold time period, such as a time to provide the one or more prompts 602 to resolve a reason for the call 110 (e.g., such as 1 minute, 2 minutes, 3 minutes, amongst other possibilities, and which may vary depending on a number and/or length of the one or more prompts 602), the server 102 may determine that the call 110 was unsuccessful (e.g., the caller 108-1 may have operated the calling device 106-1 to hang up the call 110 in frustration before the one or more prompts 602 were completed). Conversely, the server 102 may determine that the call 110 was successful when the call 110 is greater than the threshold time period.

Hence, a number of factors may be used to determine whether the call 110 was successful or unsuccessful. In some examples, the server 102 may use machine learning tech-niques to determine whether the call 110 was successful or unsuccessful, however such a determination may occur programmatically, and/or using a weighted scheme. For example, when the call 110 was greater than the threshold time period, but the transcript 802 of the call 110 indicated the reason for the call 110 was unresolved, the server 102 may determine that the call 110 was unsuccessful. Con-versely, when the call 110 was transferred to a terminal 112, the transcript 802 of the call 110 indicated the reason for the call 110 was resolved, the server 102 may determine that the call 110 was successful.

As depicted in FIG. 8, it is assumed that the call 110 was successful, and hence the training data 804 is labelled with a label 806 of "1" to indicate that the training data 804 represents a positive training example. Conversely, while not depicted, when the call 110 is unsuccessful, the training data 804 may be labelled with a label of "0" to indicate that the training data 804 represents a negative training example. Either way, the training data 804 may be used to train the ML engine 104 to operate more efficiently.

Put another way, the method 300 may further comprise: determining, based on one or more of a transcript 802 of the call 110, a length of the call 110, a respective indication received from the calling device 106-1 that made the call 110, and whether the call 110 is transferred to a human-operated terminal 112, whether the call 110 is successful or unsuccessful; and when the call is successful, training the machine learning engine 104 using the transcript 802 of the call as a positive training set.

Alternatively, or in addition, the method 300 may further comprise: determining, based on one or more of a transcript 802 of the call 110, a length of the call 110, a respective indication received from the calling device 106-1 that made the call 110, and whether the call 110 is transferred to a human-operated terminal 112, whether the call 110 is suc-cessful or unsuccessful; and when the call is unsuccessful, training the machine learning engine 104 using the transcript 802 of the call as a negative positive training set.

A particular example is next described with respect to the machine learning engine 104 comprising a generative AI engine, and the CC server 102 and the terminals 112 being components of a call center that may handle calls for a variety of reasons.

In particular, the historical data 122 may be used to train the generative AI of the machine learning engine 104 using deep learning techniques for a neural network architecture the machine learning engine 104, for example to create, at the machine learning engine 104, an understanding of the caller behavior.

For example, as previously described, the historical data 122 associated with a particular queue 118 may comprise historical caller data, social media data, and news data, and the like, while the generative AI of the machine learning engine 104 is generally configured to generate targeted and timely prompts 602 to callers 108 on a call (e.g., the call 110). However, the historical data 122 and/or other historical data associated with other queues 118 may be used to determine one or more answering prompts 402.

For example, for given call, made by a caller 108, the one or more answering prompts 402 may initially be to deter-mine and/or estimate a reason for call, and, based on one or more responses on the call, the generative AI of the machine learning engine 104 may analyze additional context (e.g., the historical data 122) of a queue 118 into which the call is placed, and which may include, but is not limited to, historical caller data, social media data, and news data, and the like.

In a particular example, a first portion of other callers 108 may have been calling because of news that a flood has hit an area associated with the callers 108, and the like, and the generative AI of the machine learning engine 104 may generate one or more answering prompts 402 to determine if the caller 108 on the call is calling about the flood, or whether the caller 108 is calling for another reason. For example, a second portion of other callers 108 may have been calling about a latest piece of CPE, or other user equipment (e.g., a phone), that is being released. Hence, the one or more answering prompts 402 may be to determine and/or estimate the reason for the call and/or category associated with queue 118 into which the call is to be placed. Once a response to the one or more answering prompts 402 is received, the call may be placed into a queue 118, and the generative AI of the machine learning engine 104 may generate one or more initial prompts 502 and one or more additional prompts 602.

Indeed, a general formula used by the generative AI of the machine learning engine 104 to generate prompts 402, 502, 602 for call may comprise:

$$PA = OCR + CR + ND + SMD \qquad \text{Equation (1)}$$

At Equation (1):

PA=Predicted Answers (e.g., IVR Prompts 402, 502, 602 generated by the generative AI of the machine learning engine 104).

OCR=Caller reasons associated with a plurality of queues 118 as received on previous calls in the queue 118 (e.g., as stored in historical data for the queues 118)

CR=Caller reasons associated with a queue 118 into which the call is placed, as received on previous calls in the queue 118 (e.g., as stored in historical data for a queue 118 into which the call is placed)

ND=News data which indicates trends in news associated with the queue 118 into which the call is placed, and/or other queues 118.

SMD=Social media data which indicates trends on social media associated with the queue 118 into which the call is placed, and/or other queues 118.

Indeed, at Equation (1), each of "OCR", "CR", "ND", and "SMD" may represent a different layer of a neural network of the generative AI of the machine learning engine 104, and the prompts 402, 502, 602 may be generated accordingly.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, cannot train machine learning engines, among other features and functions set forth herein).

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

The present specification has been described above with reference to a number of exemplary embodiments and examples. It should be appreciated that the particular embodiments shown and described herein are illustrative of the specification and its best mode and are not intended to limit in any way the scope of the specification as set forth in the claims. It will be recognized that changes and modifications may be made to the exemplary embodiments without departing from the scope of the present specification. These and other changes or modifications are intended to be included within the scope of the present specification, as expressed in the following claims.

What is claimed is:

1. A method comprising:

receiving, via a contact center (CC) server, a call;

receiving, via the CC server, on the call, an indication of a queue, of a plurality of queues maintained by the CC server, into which to place the call;

placing, via the CC server, the call into the queue indicated by the indication, the call placed into the queue in a hold state;

generating, via a machine learning engine, based on historical data associated with the queue, one or more prompts for the call; and providing, via the CC server, the one or more prompts on the call during the hold state, wherein generating one or more prompts for the call comprises:

generating, via the machine learning engine, an initial prompt, of the one or more prompts, that includes one or more estimated reasons for the call based on the historical data associated with the queue;

receiving, on the call, a selection of an estimated reason, of the one or more estimated reasons; and generating, via the machine learning engine, the one or more prompts that follow the initial prompt, based on the selection of the estimated reason.

2. The method of claim 1, wherein the machine learning engine comprises a generative artificial intelligence engine.

3. The method of claim 1, wherein the historical data comprises one or more of:

historical caller data associated with previous calls associated with a category of the queue;

respective historical data associated with a caller on the call; news data associated with the category of the queue; and social media data associated with the category of the queue.

4. The method of claim 1, wherein the historical data associated with the queue comprises caller data of a given number of previous calls that preceded the call.

5. The method of claim 1, wherein the one or more prompts for the call are further based on respective historical data associated with a caller on the call.

6. The method of claim 1, further comprising:

generating, via the machine learning engine, a final prompt, of the one or more prompts, that includes one or more of: an indication that the call is to be transferred to a human-operated terminal; and an estimated time until a transfer to the human-operated terminal; and a request for input from a calling device that made the call to indicate whether the call was successful or unsuccessful.

7. The method of claim 1, further comprising:

identifying, via the machine learning engine, an event having an aggregate effect on the queue, wherein the historical data associated with the queue comprises historical caller data of a given number of previous calls, including other calls related to the event, that preceded the call;

analyzing, via the machine learning engine, the historical caller data related to the event to determine patterns or trends influencing call volumes or caller behavior resulting from the event;

generating, via the machine learning engine, the one or more prompts specifically tailored to address an impact of the event on the queue and provide relevant information or assistance to callers affected by the event; and providing, via the CC server, the one or more prompts generated to mitigate the impact of the event on the queue.

8. The method of claim 1, further comprising:

determining, based on one or more of a transcript of the call, a length of the call, a respective indication received from a calling device that made the call, whether the call is transferred to a human-operated terminal, whether the call is successful or unsuccessful; and when the call is successful, training the machine learning engine using the transcript of the call as a positive training set.

9. The method of claim 1, further comprising:

determining, based on one or more of a transcript of the call, a length of the call, a respective indication received from a calling device that made the call, whether the call is transferred to a human-operated terminal, whether the call is successful or unsuccessful; and when the call is unsuccessful, training the machine learning engine using the transcript of the call as a negative training set.

10. A computing device comprising: a controller; and a computer- readable storage medium having stored thereon program instructions that, when executed by the controller, causes the controller to perform a set of operations comprising:

receiving, via a contact center (CC) server, a call;

receiving, via the CC server, on the call, an indication of a queue, of a plurality of queues maintained by the CC server, into which to place the call;

placing, via the CC server, the call into the queue indicated by the indication, the call placed into the queue in a hold state;

generating, via a machine learning engine, based on historical data associated with the queue, one or more prompts for the call; and providing, via the CC server, the one or more prompts on the call during the hold state, wherein the set of operations further comprise:

generating, via the machine learning engine, an initial prompt, of the one or more prompts, that includes one or more estimated reasons for the call;

receiving, on the call, a selection of an estimated reason, of the one or more estimated reasons; and generating, via the machine learning engine, the one or more prompts that follow the initial prompt, based on the selection of the estimated reason.

11. The computing device of claim 10, wherein the machine learning engine comprises a generative artificial intelligence engine.

12. The computing device of claim 10, wherein the historical data comprises one or more of: historical caller data associated with previous calls associated with a category of the queue; respective historical data associated with a caller on the call; news data associated with the category of the queue; and social media data associated with the category of the queue.

13. The computing device of claim 10, wherein the historical data associated with the queue comprises caller data of a given number of previous calls that preceded the call.

14. The computing device of claim 10, wherein the one or more prompts for the call are further based on respective historical data associated with a caller on the call.

15. The computing device of claim 10, wherein the set of operations further comprise:

generating, via the machine learning engine, a final prompt, of the one or more prompts, that includes one or more of: an indication that the call is to be transferred to a human-operated terminal; and an estimated time until a transfer to the human-operated terminal;

and a request for input from a calling device that made the call to indicate whether the call was successful or unsuccessful.

16. The computing device of claim 10, wherein the set of operations further comprise:

identifying, via the machine learning engine, an event having an aggregate effect on the queue, wherein the historical data associated with the queue comprises historical caller data of a given number of previous calls, including other calls related to the event, that preceded the call;

analyzing, via the machine learning engine, the historical caller data related to the event to determine patterns or trends influencing call volumes or caller behavior resulting from the event;

generating, via the machine learning engine, the one or more prompts specifically tailored to address an impact of the event on the queue and provide relevant information or assistance to callers affected by the event; and providing, via the CC server, the one or more prompts generated to mitigate the impact of the event on the queue.

17. The computing device of claim 10, wherein the set of operations further comprise:

determining, based on one or more of a transcript of the call, a length of the call, a respective indication received from a calling device that made the call, whether the call is transferred to a human-operated terminal, whether the call is successful or unsuccessful; and when the call is successful, training the machine learning engine using the transcript of the call as a positive training set.

18. The computing device of claim 10, wherein the set of operations further comprise:

determining, based on one or more of a transcript of the call, a length of the call, a respective indication received from a calling device that made the call, whether the call is transferred to a human-operated terminal, whether the call is successful or unsuccessful; and when the call is unsuccessful, training the machine learning engine using the transcript of the call as a negative training set.

\* \* \* \* \*